United States Patent [19]
Kaufman

[11] 3,754,502
[45] Aug. 28, 1973

[54] LEMON SLICE SQUEEZER

[76] Inventor: Irving Kaufman, Box 732, Sanford, Fla. 32771

[22] Filed: Dec. 1, 1971

[21] Appl. No.: 203,563

[52] U.S. Cl. .............................. 100/133, 100/211
[51] Int. Cl. ......................... B30b 9/02, B30b 5/02
[58] Field of Search .................. 100/133, 211, 233, 100/234; 99/491, 495, 496, 587

[56] References Cited
UNITED STATES PATENTS

| | | | |
|---|---|---|---|
| 1,836,062 | 12/1931 | Biegeleisen | 100/211 |
| 2,789,496 | 4/1957 | Turner | 100/211 |
| 3,126,821 | 3/1964 | Schlidt et al. | 100/211 X |
| 3,244,089 | 4/1966 | Wilson | 100/133 |

Primary Examiner—Peter Feldman
Attorney—Robert W. Duckworth and William M. Habby

[57] ABSTRACT

A one-piece disposable lemon slice squeezer apparatus is provided which can be produced of a moldable plastic, or the like. A lemon slice squeezer has a hollow body with an opening for inserting a lemon slice and has protrusions therein for gripping the lemon while pressing against the sides to squeeze a lemon slice placed therein. Openings at the bottom allow the juice to escape into a glass of iced tea, or the like, and a hook on the exterior conveniently allows the lemon slice to be served in the squeezer hooked to the side of the glass.

3 Claims, 5 Drawing Figures

PATENTED AUG 28 1973 3,754,502

INVENTOR.
Irving Kaufman
BY Duckworth & Hobby
ATTY'S.

LEMON SLICE SQUEEZER

BACKGROUND OF THE INVENTION

The present invention relates to lemon squeezers and especially to lemon slice squeezers adapted for hanging on a glass so that an individual may squeeze the lemon juice into the glass if desired.

In the past it has been common to serve slices of lemons with various drinks served in glasses, such as iced tea, and these lemons were commonly served laying on the side of a coaster or more commonly, the lemon slice was sliced sliding onto the rim of the glass so that the individual could lift the lemon slice off and squeeze it into the glass. This, however, has produced undesirable results such as the lemon juice squirting in several directions in addition to dropping into the glass and allowing seeds and pulp material to fall into the glass. This can produce burning in the eyes or damage clothes from the bleaching action of the lemon juice. This prior art method also leaves lemon juice on the fingers and is apt to sting cut or scratched surfaces on the skin. It is accordingly one object of the present invention to provide a simple and economical lemon slice squeezer for service with a glass which prevents lemon juice from getting on the fingers and from squirting on persons while preventing lemon seeds and pulp from getting into a drink.

Prior art lemon squeezers or lemon slice squeezers have generally involved a pair of hinged metal bodies adapted for swinging onto a lemon half or slice for squeezing the lemon to produce the juice. These devices, while performing satisfactorily, have generally been more expensive to manufacture and have not been sufficiently small and light-weight for hanging onto the glass for the service of a lemon slice with the glass. They have also been more expensive to manufacture and have been primarily developed for use within the kitchen. Prior art lemon squeezers may be seen in U. S. Pat. No. 204,325, for a lemon squeezer and shaker combined; U.S. Pat. No. 1,234,146 for a lemon squeezer; U. S. Pat. No. 593,548 for a lemon squeezer design; U.S. Pat. No. 152,270 for a fruit squeezer; U.S. Pat. No. 2,699,109 for a fruit juice extractor having decorative sides and a pair of hinged metal portions for rotating on a hinged pin for squeezing a fruit slice placed therein; and U.S. Pat. No. 2,735,360 for a lemon slice squeezer having a pair of hinged metal members for rotating on the hinge for squeezing a lemon slice placed therein and with the metal members extending to form a pair of handles for gripping. Finally, a citrus fruit server may be seen in U. S. Pat. No. 2,015,142 which provides for a protruding spear for attaching a lemon slice to and a pair of decorative metal arms attached to a base for squeezing against the fruit slice.

It is accordingly one advantage of the present invention to produce an inexpensive lemon squeezer which can be served on a glass with the lemon slice placed therein and which can be disposable, if desired, because of the inexpensive cost to produce.

Another advantage of the present lemon squeezer is to provide a lemon squeezer which may be utilized by restaurants, and the like, for advertising by having names and designs placed on one side thereof and allowing patrons to keep the lemon squeezers. Yet another object of the present invention allows thinner slices of lemon to be utilized by obtaining a more complete extraction of the juice than is normally obtained when the lemon is hand held.

SUMMARY OF THE INVENTION

The present invention relates to lemon slice squeezers and especially to an inexpensive squeezer which may be injection molded of plastics. The present lemon slice squeezer may have a hollow body shaped for inserting a lemon slice and made of material having flexible sides for pressing together against the lemon slice for squeezing the lemon. The body has protrusions extending from the inner walls for gripping the lemon and holding it in place during the squeezing of the lemon slice and has opening in the bottom for directing the escape of the squeezed lemon juice as desired by the user. The squeezer is also provided with a hook on the exterior thereof for easy placement on the side of a glass for service of a lemon slice therein. The general shape of the lemon slice squeeze follows that of a lemon slice and may have two generally rectangular sides of a flexible material joined by two end memebers, each end member having a pair of angled sides attaching each of the rectangular flexible sides together. The end members may be flat or curved and the top is open for inserting the lemon slice while the bottom has one or more openings therein for allowing the lemon juice to escape during squeezing while catching seeds or pulp

BRIEF DESCRIPTION OF THE DRAWINGS

Other objects, features and advantages of this invention will be apparent from a study of the written description and the drawings in which.

DESCRIPTION OF THE PREFERRED EMBODIMENT

Figure 1:
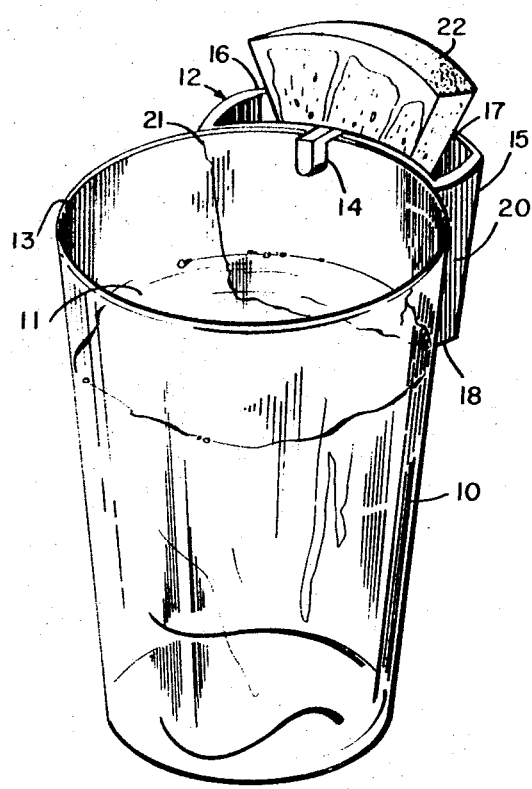
FIG. 1 shows a perspective view of a filled glass having a preferred embodiment of a lemon slice squeezer hooked thereto.

Referring more specifically to the drawings, FIG. 1 shows a perspective view of a glass 10 having a liquid beverage 11 therein and a lemon slice squeezer 12 of the present invention hanging on the upper edge 13 of the glass 10. The lemon slice squeezer 12 has a hook 14 for fitting over the top edge of the glass 13 and has a pair of generally rectangular flexible sides 15 and 16 along with an open top 17 and a bottom 18 with a pair of sides 20 and 21. The lemon 22 may be seen protruding from the lemon slice squeezer 12 for a better understanding of the invention, but it will of course be clear that a lemon slice will be served fully inserted into the lemon slice squeezer 12 so that the user may lift the lemon slice squeezer from the glass 10, squeeze or compress the sides 15 and 16 and allow the lemon juice to escape from the bottom 18 to the glass 10. This provides a convenient way to serve the lemon slice while at the same time avoiding the lemon juice from squirting onto someone sitting nearby and also from getting lemon juice on the hands of the user.

Figure 2:
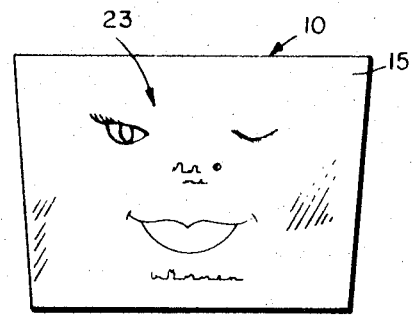
FIG. 2 is a side sectional view of the embodiment of FIG. 1.

FIG. 2 shows the lemon squeezer 10 side 15 having a decorative design indicated generally at 23 which design may include custom advertising, if desired.

Figure 3:
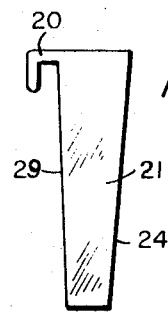
FIG. 3 is a side sectional view of the embodiment of FIGS. 1 and 2.

FIG. 3 shows the lemon slice squeezer of FIGS. 1 and 2 side member 21, the hook 20 attached to the back and having a pair of angled sides 24 and 29 for joining the sides 15 qnd 16 of FIG. 1. Angled sides 24 and 29 are used because lemons are generally sliced at angles.

Figure 4:
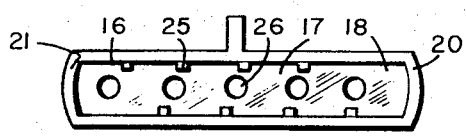
FIG. 4 is a top sectional view of the embodiment of FIGS. 1-3.

FIG. 4 illustrates yet another view looking in from the top open portion 17 onto the bottom portion 18 and shows the top of the ends 20 and 21 along with the top of the sides 15 and 16. plurality of protrusions 25 therein for gripping the lemon slice during the squeezing thereof, and the bottom 18 can be seen as having a plurality of openings 26 for allowing the lemon juice to escape.

Figure 5:
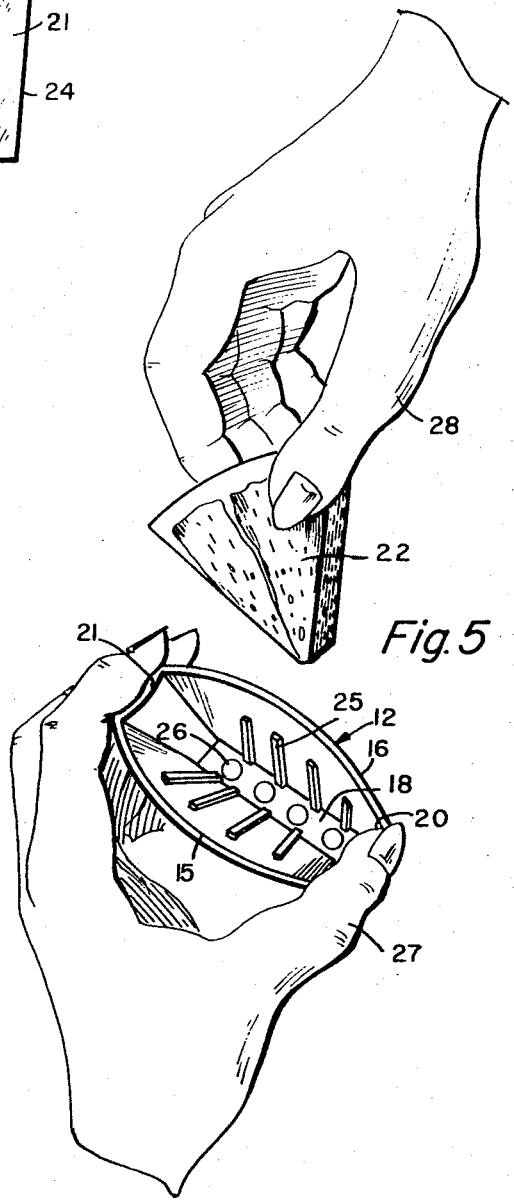
FIG. 5 shows a perspective view of a lemon slice squeezer in accordance with the present invention being loaded with a lemon.

FIG. 5 shows a pair of hands 27 and 28 inserting the lemon 22 into the lemon slice squeezer 12 by squeezing the ends 20 and 21 to expand the sides 15 and 16 during insertion. Sides 15 and 16 will then collapse against the lemon 22 when released and will be squeezed towards each other to squeeze the lemon slice 22. Protrusions 25 can be more clearly seen in this view and are illustrated as a plurality of protruding rails, but it should be clear to those skilled in the art that other types of protruding members including pointed members or hooks could be utilized without departing from the spirit and scope of the present invention. The openings 26 in the bottom member 18 can also be seen and it should be clear in this connection that a single opening of a different shape, such as a slot, could be utilized rather than the plurality of round openings 26, without departing from the spirit and scope of the present invention.

Accordingly, this invention is not to be construed as limited to the particular forms disclosed herein since these are to be regarded as illustrative rather than restrictive.

I claim:

1. A lemon slice squeezer apparatus comprising a hollow body member shaped for inserting a slice of lemon through an opening therein, and having a pair of flexible sides for squeezing together to squeeze a lemon slice placed in said hollow body, said body having elongated protrusions protruding from the inner walls into the hollow portions thereof for gripping a lemon slice during the squeezing thereof; said body having a second opening for juice squeezed from a slice of lemon to pass through; and having a hook fixedly attached to one said compressible side of said body for hanging said lemon slice squeezer onto a glass, or the like, and said elongated protrusions extending vertically between said opening for inserting a slice of lemon through and said second opening; said hollow body member being a single molded plastic member having a pair of flat flexible sides connected together at either end by a pair of end members each having a pair of angled sides attaching each said end to each said flexible side.

2. The apparatus in accordance with claim 1 but having a plurality of openings in the bottom thereof.

3. The apparatus in accordance with claim 1 in which said lemon slice squeezer flexible side has a design on the exterior thereof.

* * * * *